United States Patent
Walker

(10) Patent No.: US 11,063,665 B2
(45) Date of Patent: Jul. 13, 2021

(54) TUNEABLE FILTER GRATING FOR OWC

(71) Applicant: pureLiFi Limited, Edinburgh (GB)

(72) Inventor: Duncan John William Walker, Edinburgh (GB)

(73) Assignee: PURELIFI LIMITED, Edinburgh (GB)

( * ) Notice: Subject to any disclaimer, the term of this patent is extended or adjusted under 35 U.S.C. 154(b) by 0 days.

(21) Appl. No.: 16/766,875

(22) PCT Filed: Nov. 30, 2018

(86) PCT No.: PCT/GB2018/053482
§ 371 (c)(1),
(2) Date: May 26, 2020

(87) PCT Pub. No.: WO2019/106385
PCT Pub. Date: Jun. 6, 2019

(65) Prior Publication Data
US 2020/0374003 A1    Nov. 26, 2020

(30) Foreign Application Priority Data
Nov. 30, 2017  (GB) ...................... 1719996

(51) Int. Cl.
*H04B 10/116* (2013.01)
*H04J 14/02* (2006.01)

(52) U.S. Cl.
CPC ........ *H04B 10/116* (2013.01); *H04J 14/0213* (2013.01)

(58) Field of Classification Search
CPC ........................... H04B 10/116; H04J 14/0213
(Continued)

(56) References Cited

U.S. PATENT DOCUMENTS 4,685,773 A    8/1987  Carlsen et al.
6,097,859 A  * 8/2000  Solgaard .............. G02B 6/3516
                                                     385/17
(Continued)

FOREIGN PATENT DOCUMENTS

EP    1126293         8/2001
EP    3076567 A1    10/2016
(Continued)

OTHER PUBLICATIONS

ISA; International Search Report dated Mar. 22, 2019 in Application No. PCT/GB2018/053482.
(Continued)

*Primary Examiner* — Dalzid E Singh
(74) *Attorney, Agent, or Firm* — Snell & Wilmer, L.L.P.

(57) ABSTRACT

An optical wireless communication (OWC) receiver apparatus for receiving data streams from at least one transmitter apparatus, each data stream encoded on a beam of light of a respective different wavelength or range of wavelengths propagating through free space between the at least one transmitter apparatus and the receiver apparatus, the apparatus comprising: a wavelength-selective element configured to receive the beams after their propagation through free space and to direct a selected at least one of the beams having a selected wavelength or range of wavelengths to a detector, wherein the detector is configured to receive said selected at least one of the beams and in response to output a detection signal; at least one control element operable to control at least one physical property of the wavelength-selective element thereby to select said at least one of the beams for direction to the detector.

29 Claims, 7 Drawing Sheets (a)

(b)

(58) Field of Classification Search
USPC .......................................................... 398/87
See application file for complete search history.

(56) References Cited

U.S. PATENT DOCUMENTS

| | | | |
|---|---|---|---|
| 6,144,472 | A | 11/2000 | Knox |
| 6,151,144 | A | 11/2000 | Knox |
| 6,310,993 | B1 | 10/2001 | Cao et al. |
| 6,363,184 | B2 | 3/2002 | Cao |
| 6,865,317 | B2 | 3/2005 | Vahala et al. |
| 6,870,679 | B2 | 3/2005 | Randall et al. |
| 6,888,987 | B2 | 5/2005 | Sercel et al. |
| 6,891,996 | B2 | 5/2005 | Sercel et al. |
| 6,891,997 | B2 | 5/2005 | Sercel et al. |
| 6,954,590 | B2 | 10/2005 | Kandpal et al. |
| 7,046,931 | B2 | 5/2006 | Boroditsky et al. |
| 7,092,631 | B2 | 8/2006 | Boroditsky et al. |
| 7,233,606 | B2 | 6/2007 | Varshneya et al. |
| 9,503,186 | B2 | 11/2016 | Kawanishi et al. |
| 9,705,630 | B2 | 7/2017 | Liboiron-Ladouceur et al. |
| 2002/0037132 | A1 | 3/2002 | Sercel et al. |
| 2002/0041730 | A1 | 4/2002 | Sercel et al. |
| 2002/0044739 | A1 | 4/2002 | Vahala et al. |
| 2004/0136074 | A1* | 7/2004 | Ford .................. G02B 6/29314 359/572 |
| 2004/0197051 | A1 | 10/2004 | Sercel et al. |
| 2005/0018715 | A1 | 1/2005 | Vershneya et al. |
| 2006/0228071 | A1* | 10/2006 | Davis .................. G02B 6/4215 385/16 |
| 2010/0008671 | A1* | 1/2010 | Pratt .................... H04B 10/506 398/83 |
| 2014/0270791 | A1* | 9/2014 | Hyde .................. H04B 10/116 398/118 |
| 2015/0124430 | A1* | 5/2015 | Mehl ........................ F21V 9/45 362/84 |
| 2016/0112776 | A1* | 4/2016 | Kim .................. G02F 1/136286 398/48 |
| 2017/0153319 | A1 | 6/2017 | Villeneuve et al. |
| 2017/0155225 | A1 | 6/2017 | Villeneuve et al. |
| 2017/0199277 | A1 | 7/2017 | Villeneuve et al. |
| 2017/0346556 | A1* | 11/2017 | Tiecke ................. H04B 10/112 |

FOREIGN PATENT DOCUMENTS

| | | |
|---|---|---|
| WO | 2001061394 | 8/2001 |
| WO | 2001061395 | 8/2001 |
| WO | 2001061870 | 8/2001 |
| WO | 2001065701 | 9/2001 |
| WO | 2004114478 | 12/2004 |
| WO | 2015018352 | 2/2015 |

OTHER PUBLICATIONS

ISA; Written Opinion dated Mar. 22, 2019 in Application No. PCT/GB2018/053482.

ISA; International Preliminary Report on Patentability dated Jun. 11, 2020 in Application No. PCT/GB2018/053482.

* cited by examiner (a)

(b)

TUNEABLE FILTER GRATING FOR OWC

CROSS-REFERENCE TO RELATED APPLICATIONS

This application is a national stage application of PCT/GB2018/053482, filed on Nov. 30, 2018, which claims priority to GB Application No. 1719996.9, filed on Nov. 30, 2017, which are hereby incorporated by reference in their entirety for all purposes.

INTRODUCTION

The present invention relates to an optical wireless communication receiver apparatus, in particular to a wavelength-selective element and control element.

BACKGROUND

It is known to provide wireless data communications by using light instead of radio frequencies to transmit and receive data wirelessly between devices. Data may be transmitted using light by modulating at least one property of the light, for example an intensity of the light. Methods that use light to transmit data wirelessly may be referred to as optical wireless communications (OWC) or light communications (LC).

Different OWC protocols have different characteristics. For example, LiFi communication provides for high bandwidth, full-duplex communication using light, for example visible light or a combination of visible light and non-visible light, and can provide for the use of spectrum hopping and other spread spectrum techniques.

Wireless networks using light may in some circumstances allow a higher data capacity, greater energy efficiency and greater security than radio frequency wireless networks, and may also be used to replace point-to-point infrastructure in locations where conventional infrastructure does not exist or is too expensive to build.

OWC may provide communication using any suitable light source. For example, OWC may provide simultaneous wireless communication and illumination from luminaires (for example, LED luminaires) that have traditionally only been utilised for lighting or notification purposes. Thus, simultaneous optical wireless communication and illumination or other function may be provided. Optical wireless communication in such cases may be provided by modulating, for example, one or more wavelength channels of the light produced by the luminaires so that data that is to be transmitted is represented by the modulation of the light. Usually the modulation of the light occurs at such a frequency that it is imperceptible to the naked eye.

Optical wireless communication may normally provide line-of-sight, or reflected, communication between two compatible devices, each of which includes a light transmitter and/or receiver.

FIG. 1 illustrates a known method for increasing bandwidth of an OWC system. The method relates to wavelength division multiplexing (WDM) and involves encoding data on N different wavelengths. As shown in FIG. 1, light is produced on N different wavelengths by using N different light sources. If each wavelength allows for a data rate of up to B bits per second, then the overall system data rate can reach N.B bits per second. As part of this transmission process, it is necessary to combine signals at the transmitter and then separate the signals at the corresponding receiver. Unlike a fibre optic system, described later, in an OWC system each light source emits light into a cone. As an example, the cone may have a full-width at half maximum (FWHM) angle of 60 degrees. In contrast to the fibre optic case described below, there is no requirement to combine signals to be transmitted through the same physical space so there is no need to perform a multiplexing operation at the transmitter end.

At the detector side, to reduce interference between different signals, there may be a requirement to provide an optical receiver than can collect light having one wavelength or a wavelength in one wavelength band, or to provide a plurality of optical receivers comprising photodetectors together with static filters that restrict the wavelength of light incident on the photodetector and detected by the photodetector. For the case with more than one optical receiver, filters may reduce interference between different communication channels, as the filter ensures that only light of a certain wavelength is detected. Such a set up may require many filters and detectors and thus may be bulky.

In an OWC system, such as one comprising a LiFi-enabled mobile device, both the source and optical receiver may be free to move relative to each other, thereby changing the geometry of the system. Known filters capable of selecting a wavelength of light are typically sensitive to the angle at which the incident light hits the filter. The angle sensitivity typically changes the amount of light that can be received by the receiver as the geometry changes. A change in geometry is illustrated in FIG. 2, where a detector is shown in two different positions and hence at two different angles of incidence.

FIG. 3 shows a known, typical, fibre optic communication system. A transmitter couples an optical signal into an optical fibre. The optical signal may have multiple wavelength bands and all these bands are coupled into the same physical space defined by the fibre optic between the transmitter and receiver. The multiple wavelength bands are combined by performing a form of wavelength division multiplexing (for example, coarse wavelength division multiplexing or dense wavelength division multiplexing). Fibre optic communication systems, such as the one shown in FIG. 3, are not suitable for use with OWC enabled mobile devices.

It is known to separate different wavelengths at the receiver end of an optical fibre system using wavelength separating means, for example, arrayed waveguide gratings (AWG), Bragg gratings and etalons. The detector and wavelength separating means are fixed at an end of the optical fibre, so a consistent signal is received when moving the transmitter and/or receiver. The geometry between the receiver and wavelength separating means is fixed. The receiver is physically tethered to the transmitter by the optical fibre and hence not free to move.

SUMMARY

According to a first aspect of the present invention, there is provided an optical wireless communication (OWC) receiver apparatus for receiving data streams from at least one transmitter apparatus, each data stream encoded on a beam of light of a respective different wavelength or range of wavelengths propagating through free space between the at least one transmitter apparatus and the receiver apparatus, the apparatus comprising: a wavelength-selective element configured to receive the beams after their propagation through free space and to direct a selected at least one of the beams having a selected wavelength or range of wavelengths to a detector, wherein the detector is configured to receive said selected at least one of the beams and in response to output a detection signal; at least one control element operable to control at least one physical property of the wavelength-selective element thereby to select said at least one of the beams for direction to the detector.

The wavelength-selective element may comprise compensating means to compensate for movement of the detector relative to the transmitter apparatus.

The OWC receiver apparatus may comprise a LiFi receiver apparatus.

The wavelength-selective element may be wavelength-sensitive such as to direct the selected at least one of the beams in a first direction relative to its direction of receipt based on its wavelength, and to direct at least one other of the beams in a second, different direction relative to its direction of receipt based on its wavelength.

The wavelength-selective element may be configured to receive the beams from substantially the same direction and to direct the beams in substantially different directions in dependence on their wavelengths.

The wavelength-selective element may be configured to receive the beams simultaneously as at least partially spatially overlapping beams.

The wavelength-selective element may comprise at least one diffractive or refractive element.

The wavelength-selective element may comprise at least one of a diffraction grating, a filter, a prism or an etalon.

Directing may comprise transmitting or reflecting.

The wavelength-selective element may comprise at least one of a diffraction grating, a filter, a prism or an etalon.

The wavelength selective element may comprise a wavelength convertor element configured to change the wavelength or range of wavelengths of the received beams. The wavelength convertor element may be further configured to lengthen the wavelength of the received beams.

The at least one physical property may comprise temperature. The at least one physical property may comprise position or orientation.

The at least one control element may comprise at least one of a heating device, a cooling device or an actuator.

The apparatus may further comprise a controller operable to control operation of the at least one control element, thereby to select the beam(s) and/or wavelength(s).

The controller may be configured to control operation of the at least one control element in response to at least one of: the detection signal; an orientation or position of the OWC receiver apparatus or the at least one source; a relative orientation or position of the OWC receiver apparatus and the at least one source; an instruction selecting at least one of the wavelengths; movement of the OWC receiver apparatus and/or the at least one source.

The controller may be configured to control operation of the at least one control element to maximise an amplitude or signal-to-noise ratio of the detection signal obtained in respect of the selected at least one beam and/or to maximise an amplitude or signal-to-noise ratio of a data signal representing the data stream of the selected beam and obtained by processing the detector signal.

The controller may be configured to implement a control algorithm to vary or maintain said at least one physical property of the wavelength-selective element over time thereby to maintain alignment of the selected at least one beam with the detector.

The detector may be positioned in a far-field position relative to the wavelength-selective element.

The apparatus may further comprise at least one optical element between the wavelength-selective element and the detector. The at least one optical element may comprise at least one lens and/or focussing element.

The detector may further comprise a photodetector. The detector may be sensitive to a range of wavelengths that includes the different wavelengths or ranges of wavelengths of a plurality of the beams.

The detection signal may be representative of the data stream(s) represented by the selected at least one of the beams The data streams may be encoded using a pre-determined communication protocol, optionally a wavelength-division multiplexing protocol.

The data streams may represent a set of data. Different portions of the set of data may be encoded on different ones of the beams according to the communication protocol.

The source may comprise a plurality of transmitters each configured to output light of respective different wavelength or ranges of wavelength.

The beams of light may comprise at least one of beams of visible light, infra-red light or ultra-violet light.

The receiver apparatus may further comprise the detector.

According to a second aspect of the present invention, there is provided an optical wireless communication system comprising: a receiver apparatus according to the first aspect of the invention and at least one transmitter apparatus configured to transmit a data stream encoded on a beam of light.

According to a third aspect of the present invention, which may be provided independently, there is provided a method of controlling an optical wireless communication comprising: operating a wavelength-selective element associated with a receiver, wherein the receiver is configured to receive data streams from at least one transmitter apparatus, each data stream encoded on a beam of light of a respective different wavelength or range of wavelengths propagating through free space between the at least one transmitter apparatus and the receiver and wherein the wavelength-selective element is configured to receive light beams after their propagation through free space and to direct a selected at least one of the beams having a selected wavelength or range of wavelengths to a detector, wherein the detector is configured to receive said selected at least one of the beams and in response to output a detection signal, wherein operating the wavelength-selective element comprises controlling at least one physical property of the wavelength-selective element thereby to select said at least one of the beams for direction to the detector.

According to a further aspect of the present invention, which may be provided independently, there is provided an optical wireless communication (OWC) method comprising: receiving, by a receiver apparatus, data streams from at least one transmitter apparatus, each data stream encoded on a beam of light of a respective different wavelength or range of wavelengths propagating through free space between the at least one transmitter apparatus and the receiver apparatus; receiving, by a wavelength-selective element of the receiver apparatus, the beams after their propagation through free space; controlling, by at least one control element of the receiver apparatus, at least one physical property of the wavelength-selective element thereby to select at least one of the beams having a selected wavelength or range of wavelengths; directing, by the wavelength-selective element, the selected at least one of the beams to a detector; receiving, by the detector, said selected at least one of the beams; and outputting, by the detector, a detection signal in response to receiving said selected at least one of the beams.

There may also be provided an apparatus or method substantially as described herein with reference to the accompanying drawings.

Features in one aspect may be applied as features in any other aspect, in any appropriate combination. For example, device features may be provided as method features or vice versa.

BRIEF DESCRIPTION OF THE DRAWINGS

Various aspects of the invention will now be described by way of example only, and with reference to the accompanying drawings, in which.

DETAILED DESCRIPTION OF THE DRAWINGS

The term light herein may be used, for example, to refer to electromagnetic waves with wavelengths in a range 1 nm to 2500 nm, which includes ultraviolet, visible light and near-infrared wavelengths.

Figure 1:
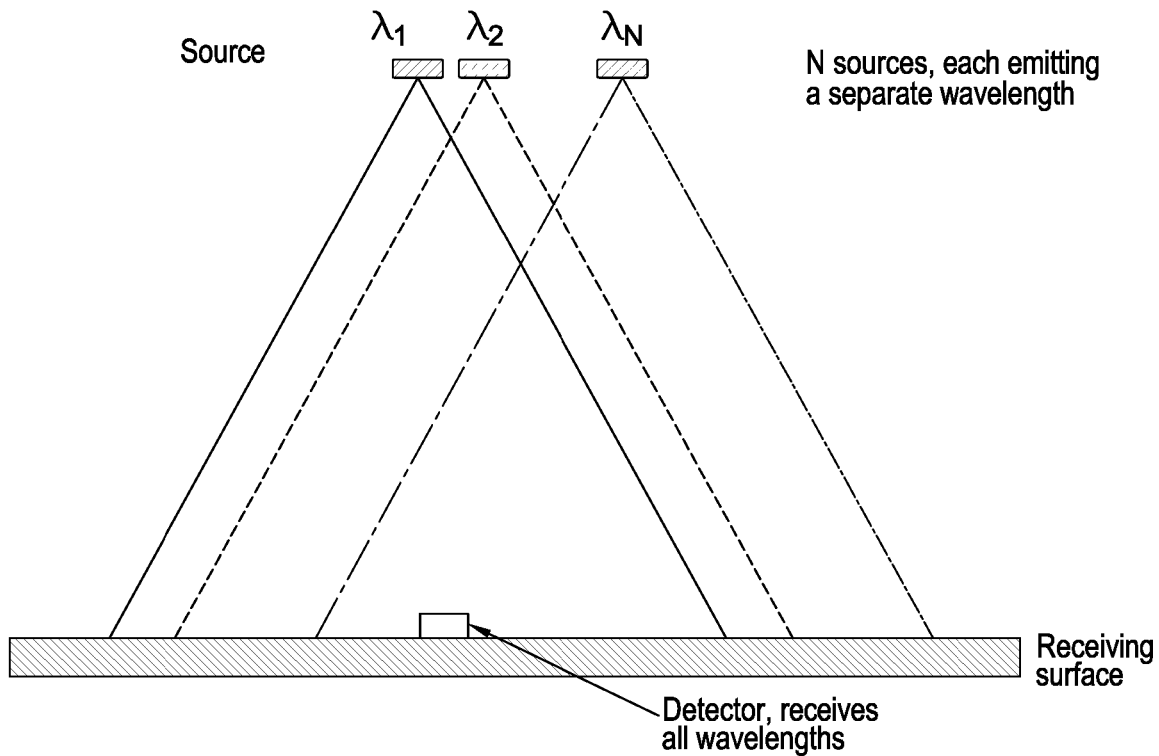
FIG. 1 is a schematic diagram illustrating a known method for increasing bandwidth of an OWC system.
Figure 2:
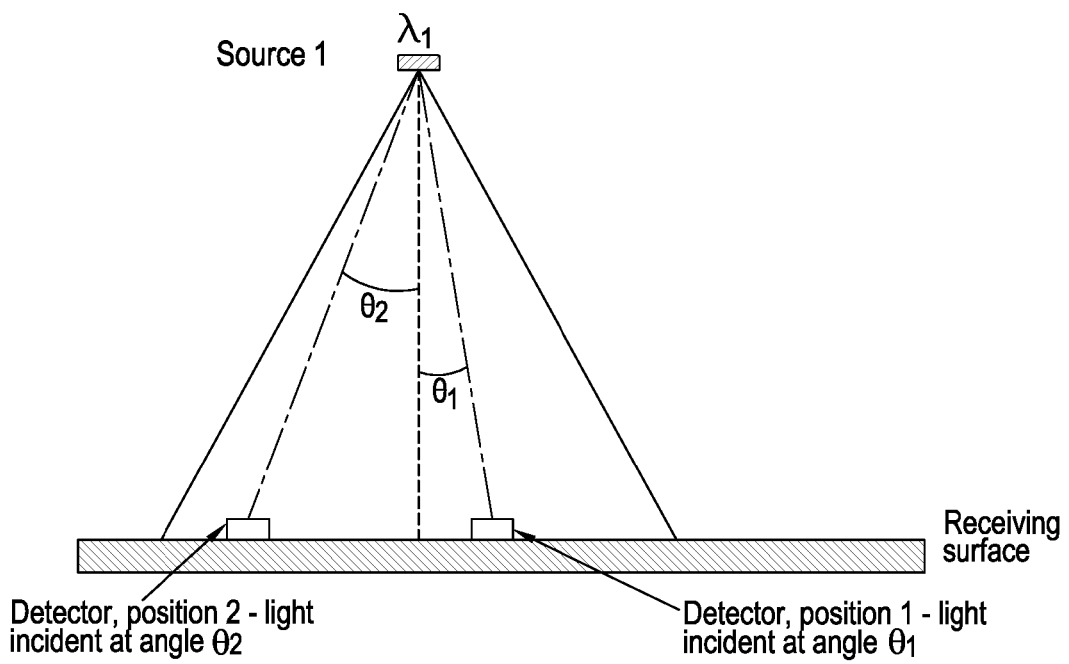
FIG. 2 is a schematic diagram illustrating a known method for increasing bandwidth of an OWC system, showing a different geometry from that shown in FIG. 1.
Figure 3:
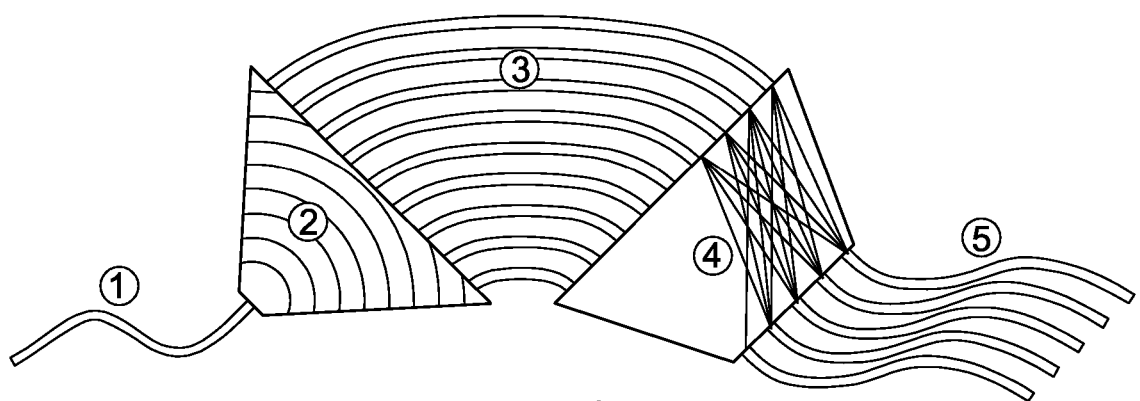
FIG. 3 is a schematic diagram showing a known, typical, fibre optic communication system.
Figure 4:
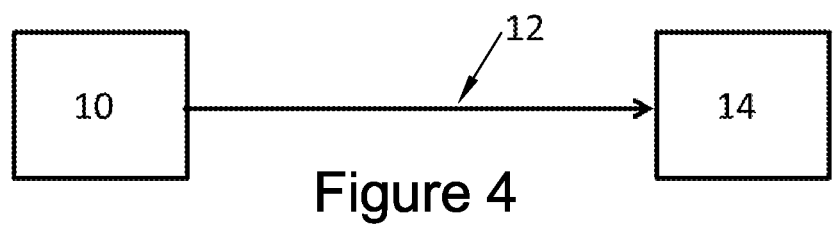
FIG. 4 is a schematic diagram of a transmitter and receiver using optical wireless communication.

FIG. 4 is a schematic block diagram illustrating principles of optical wireless communication according to embodiments. FIG. 4 shows a transmitter apparatus 10 and a receiver apparatus 14. The transmitter 10 is configured to send wireless optical signals in which information is encoded through an optical communication channel 12 to the receiver apparatus 14. The optical wireless communication channel 12 is a free-space communication channel. The optical communications channel 12 has a characteristic optical wavelength.

Free space communication channels include transmission of optical signals through air, space, vacuum, fluid such as water or similar. Free space communication does not include using solids to communicate, for example, optical fibre cables.

Transmitters and receivers may be provided on different devices. One type of device that is used is an access point. Access points may provide access to a network. Another type of device is a station. Stations may be mobile or fixed. Without limitation, examples of stations include personal computers, desktops, laptops and smart devices.

The transmitter apparatus 10 includes a light emitting diode (LED), laser or other suitable light source, and an associated driving circuit to drive the LED or laser to produce the optical signal. The associated driving circuitry includes a digital to analogue convertor configured to provide a modulation signal at a frequency characteristic of an optical light communication signal. A further processor, provided as part of the transmitter apparatus or associated with the transmitter apparatus, modulates data onto a drive current and the driving circuitry provides the drive current to the LED or laser. The LED or laser then produces an outgoing modulated optical wireless communication signal that carries the data.

The receiver apparatus 14 includes a photodiode, or other suitable light detector, with associated circuitry to condition any received signal. The photodiode converts received light to an electronic signal which is then conditioned by the conditioning circuitry. Conditioning may include one or more filter steps; amplification of a weak electrical signal; equalisation of received signals and converting the analogue signals into digital signals using an analogue to digital convertor. The digital signals can then be provided to a further processor, provided as part of the receiver apparatus or associated with the receiver apparatus, to be demodulated to extract communication data.

Any suitable modulation scheme may be used, for example orthogonal frequency division multiplexing (OFDM) modulation schemes are used in some embodiments, and the demodulation is a demodulation from the OFDM modulation scheme. In further embodiments, other modulation schemes may be used.

An access point may provide data transmission to and/or from a radio frequency wireless network, optionally a Wi-Fi network and/or an optical wireless communications network, optionally a LiFi network.

The communication channel 12 provides a data stream between the transmitter apparatus 10 and the receiver apparatus 14. More than one free space communication channel of different wavelengths or range of wavelengths can be set up between the transmitter and the receiver. This may lead to increased data transfer or bandwidth or increased flexibility in selecting which data stream to receive. More than one free space communication channel can be achieved, for example, by providing more than one light source as part of the transmitter apparatus. In some embodiments, a plurality of transmitter and a plurality of receivers may be provided and a plurality of free space communication channels set up between them.

Figure 5:
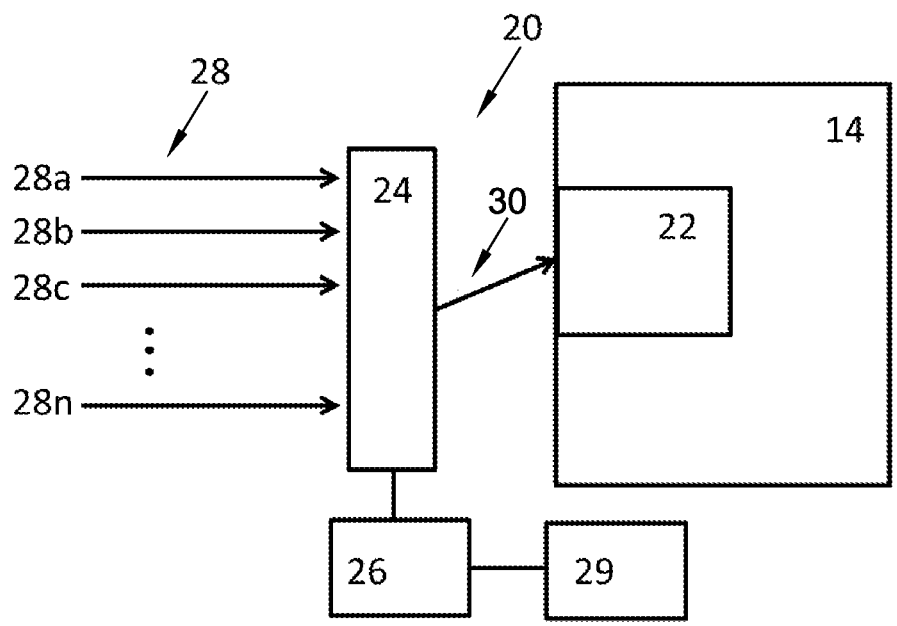
FIG. 5 is a schematic diagram of an optical wireless communication apparatus associated with a receiver for wavelength selection.

FIG. 5 is a schematic block diagram illustrating a system comprising an optical wireless communication apparatus 20 associated with the receiver apparatus 14. As described above, the receiver has a photodetector 22, for example, a photodiode. In some embodiments, the apparatus 20 may include or incorporate, at least in part, the receiver 14 or detector 22.

The apparatus 20 has a wavelength-selective element 24 and a control element 26. A controller 29 configured to communicate with the control element is also provided. The control element 26 is coupled to the wavelength-selective element 24 such that the control element 26 can control a physical property of the wavelength-selective element 24, for example, temperature, position or orientation. The wavelength-selective element 24 and control element 26 thereby operate to select an optical signal from a plurality of optical signals incident on the wavelength selective element 24 and to direct the selected optical signal towards the photodetector 22. This allows data represented by or carried by the selected optical signal to be received by the receiver 14.

Figure 6:
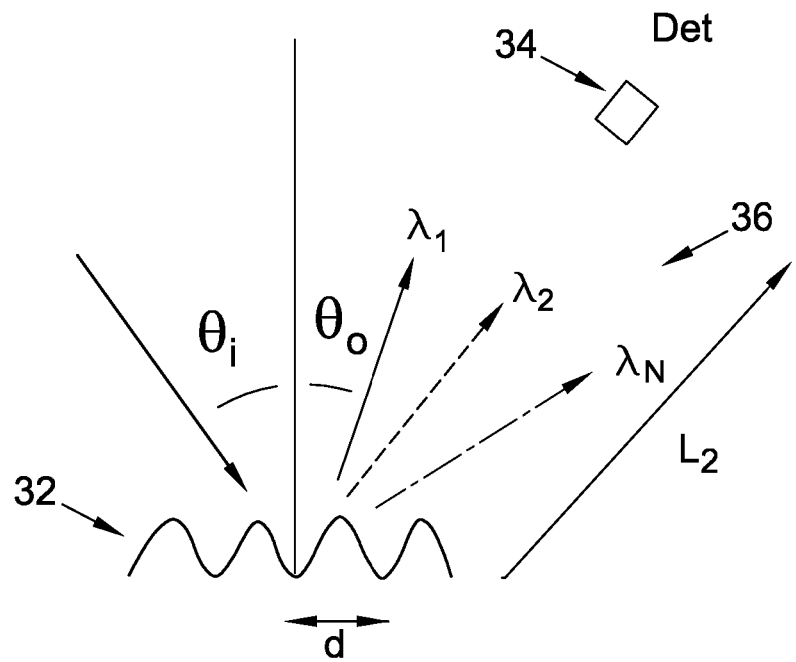
FIG. 6 is a schematic diagram of a diffraction grating.
Figure 7:
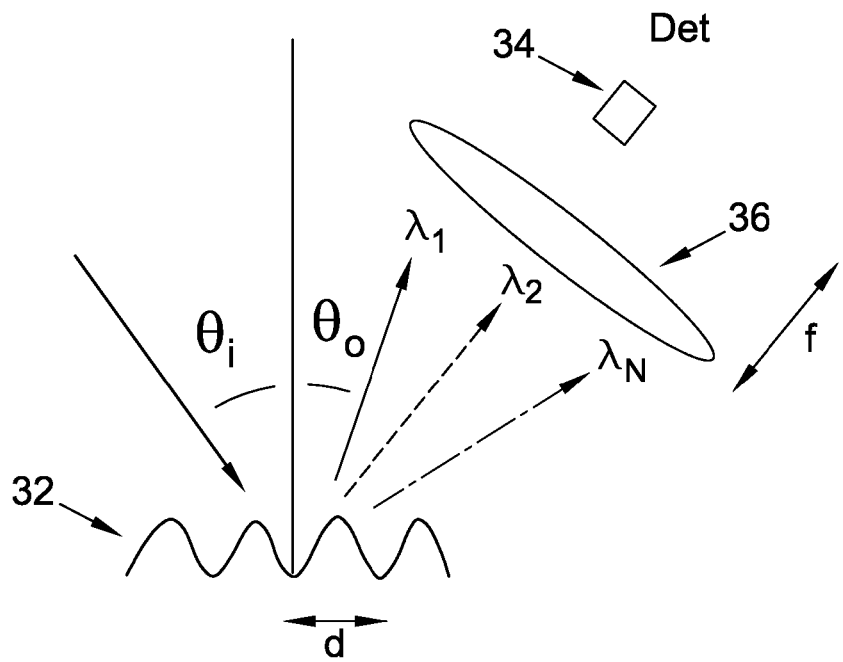
FIG. 7 is a schematic diagram of a first wavelength-selective element.
Figure 8:
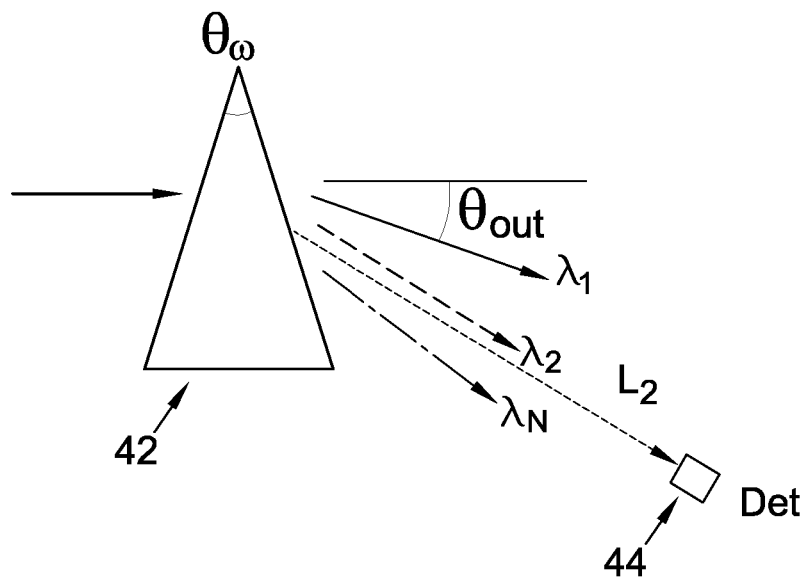
FIG. 8 is a schematic diagram of a second wavelength-selective element.
Figure 9:
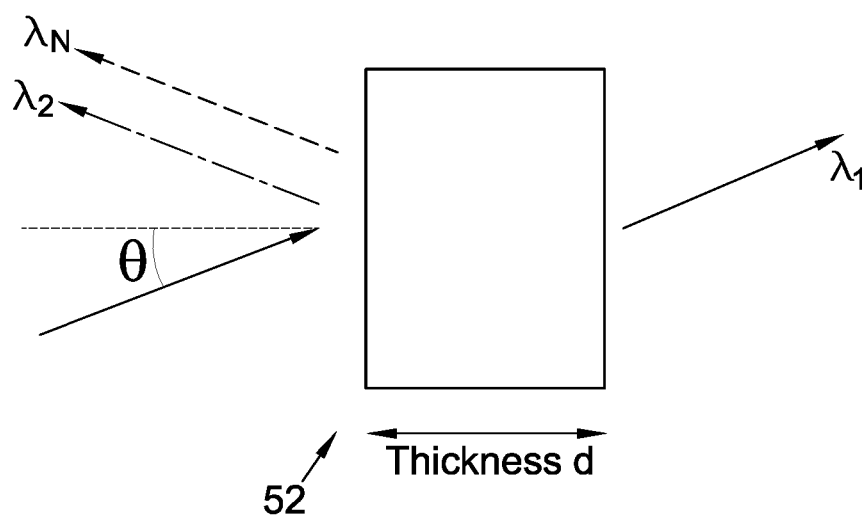
FIG. 9 is a schematic diagram of a third wavelength-selective element.
Figure 11:
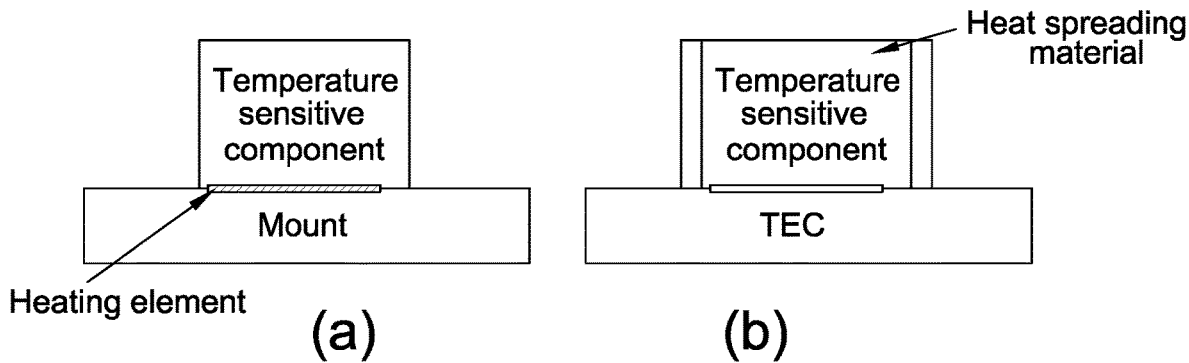
FIG. 11 shows two embodiments of a control element.

FIGS. 6, 7, 8 and 9 show specific examples of the wavelength-selective element according to embodiments. Wavelength-selective elements may include: a diffraction transmission grating, a diffraction reflection grating (as shown in FIGS. 6 and 7), a refraction prism (as shown in FIG. 8) or a glass etalon (as shown in FIG. 9). The control element may be a temperature sensitive control element (as shown in FIG. 11) or a mechanical control element. However, it will be understood that any device capable of separating or selecting light of different wavelengths where the separation or selection is dependent on a physical property of the device which can be controlled or changed by an external stimulus may be suitable as the wavelength-selective element.

Returning to FIG. 5, the photodetector 22 is sensitive to light over a range of wavelengths that optionally include the wavelengths of light incident on the wavelength-selective element. The photodetector 22 is configured to detect light and convert the detected light into a detection signal. A processing resource of or associated with the receiver 14, is configured to process the detection signal by performing a data extracting or demodulating process to extract data from the detection signal. The detection signal is representative of the data stream represented by the selected beam.

In some embodiments, the wavelength selective element may comprise a wavelength convertor element that is configured to change a wavelength of light incident on the wavelength selective element. Wavelength conversion may achieve higher levels of signal concentration in an optical element than possibly using only a single wavelength. In some embodiments, the wavelength convertor element may change a wavelength of incident light from a first wavelength to a second wavelength. The second wavelength may be longer than the first wavelength. The first wavelength may correspond to a wavelength of visible light and the second wavelength may correspond to a wavelength of infrared light. In some embodiments, the wavelength convertor element comprises fluorescent dye or quantum dot wavelength converters.

As described above, a physical property of the wavelength-selective element is controlled by the control element 26. The physical property of the wavelength-selective element is controlled so that it takes one of a plurality of measurable values. In some embodiments the plurality of measurable values may be replaced by a plurality of subranges of measurable values. For each measurable value the wavelength-selective configuration adopts a corresponding physical configuration. The physical configuration allows differentiated treatment of light based on wavelength.

Returning to FIG. 5, light beam 28 is shown as incident on the wavelength-selective element 24. The light beam is from one or more light sources that are not shown in FIG. 5. The light beam 28 includes a plurality of light beams, where each light beam of the plurality of light beams has a different wavelength. This may be achieved, for example, by using light sources configured to emit light of different wavelengths. The plurality of light beams may have wavelengths in wavelength ranges that do not overlap in wavelength. The plurality of light beam may at least in part spatially overlap. The different wavelength light beams are labelled 28a, . . . 28n.

Although represented schematically in FIG. 5 as parallel lines, it will be understood that the different wavelength light beams 28a, . . . 28n shown in FIG. 5 are representative of spatially overlapping light beams. The light beams 28a, . . . 28n, spatially overlap on their propagation path from source(s) to detector to the extent that they can be considered to form a single light beam 28 for at least part of their propagation path. The light beams 28a, . . . 28n are considered to form a single light beam at least at the point the light beams are received by the surface of the wavelength-selective element 24. It will also be understood that the light beams 28a, . . . . 28n are incident at substantially the same point of the wavelength-selective element 24.

In one example, more than one light source may emit light into more than one respective cones and these cones overlap in space.

A selected light beam 30, as selected by the wavelength-selective element, is shown being directed by the selective element 24 to the photodetector 22. The beams of light 28 comprise at least one of beams of visible light, infra-red light or ultra-violet light.

In some embodiments, data streams corresponding to the light beams 28a, . . . 28n may be encoded using a predetermined communication protocol, for example, a wavelength-division multiplexing protocol. The streams represent a set of data, and different portions of the set of data may be encoded on different beams according to a communication protocol.

The wavelength selective element 24 is configured to receive the plurality of light beams 28 where each light beam has a different wavelength and to select one of the plurality of light beams 28 and direct the selected light beam toward the receiver. The wavelength selective element 24 is configured to receive the plurality of light beams simultaneously.

The control element 26 is coupled to the wavelength-selective element 24 and is configured to interact with the wavelength-selective element 24 to control at least one physical property of the wavelength-selective element 24. By controlling at least one physical property of the wavelength-selective element 24, the control element 26 allows selection of the selected beam for direction to the photodetector 22. The control element 26 thus allows data carried by different wavelength channels to be received by the receiver 14. The selected wavelength and directed to the photodetector 22 may be switched by changing the physical property of the wavelength-selective element 24.

Returning to FIG. 5, in operation, the controller 29 sends a control signal to the control element 26 which, in response to receiving the control signal, controls by varying or maintaining, a physical property of the wavelength-selective element 24. The plurality of light beams 28a, 28b, 28c, . . . 28n are received by the wavelength selective element 24. The wavelength-selective element 24 allows one of the light beams to be directed towards the photodetector 22.

The controller may send further control signals to the control element to vary the physical property of the wavelength-selective element to change the direction of the selected light beam 30 or change the transmitted wavelength or to change which of the plurality of light beams 28a, . . . , 28n is directed to the detector 22. Control of the control element is described in further detail with reference to FIG. 12.

In some embodiments, a controller 29 is provided that is operable to control operation of the control element 26 to allow selection of the light beam and/or wavelength. The controller may form part of the receiver apparatus 14 and may use a received signal or properties of the received signal to generate a control signal. The controller may be in electrical communication with the control element and may comprise a processing resource for processing received signal and to generate control signals.

The control signal may be coupled to one or more sensors and may generate control signals based on sensor signals from the one or more sensors. In some embodiments, the one or more sensors includes the detector 22 and the sensor signal is or is based on the detection signal. In some embodiments, the one or more sensors includes further sensors of the receiver apparatus 14 or a device associated with the receiver apparatus, for example, an accelerometer or other light sensor. In some embodiments, the one or more sensors may include sensors associated with at least one of the transmitters of the light beams 28a, . . . 28n and the sensor signal may be transmitted to the receiver apparatus by optical signal or other wireless signal.

The sensor signals used to generate control signals may be representative of a position and/or orientation of the receiver and the transmitter. The position and/or orientation of the receiver and the transmitter may be relative to each other or to another point in space. The sensor signals may be representative of a movement of the receiver and/or the transmitter.

In some embodiments, the control signals may be generated based on instructions generated by a further processor or a user. For example, a further processor may instruct that a certain wavelength is to be selected.

The controller may use a feedback process to control operation of the control element to maximise or a property of the detected signal, for example, the amplitude or signal to noise ration or to maximise a property of the received data signal obtained by processing the received detection signal. The property may be an amplitude or signal-to-noise ratio.

In some embodiments a control algorithm is implemented. An example of a control algorithm is described with reference to FIG. 12. The control algorithm may maintain or vary the physical property to maintain alignment of the beam with the detector.

Turning to further details of the control element 26, this element may comprise mechanical and/or non-mechanical components. A mechanical control element may provide control over position and/or the orientation of the wavelength-selective element to select the beam. The mechanical control element may be, for example, an actuator or other suitable mechanism for tilting or otherwise adjusting the wavelength-selective element.

A non-mechanical control element may provide control over a non-mechanical property of the wavelength-selective element. For example, a heating device or a cooling device may be used. The coupling of the wavelength-selective element and the control element is described in further detail with reference to FIG. 11.

In some embodiments, at least one of the receiver apparatus and the transmitter apparatus may be portable such that they can be moved relative to each other. However, the selective-wavelength element and control element are provided in a fixed spatial relationship. One or both of these elements may have an adjustable position relative to the other element.

As described with reference to FIG. 13, in some embodiments, a portable receiver and/or transmitter uses further compensating resources to compensate for a change in angle of incidence of the incoming light beam on the wavelength-selective element.

The further compensating resources may be a further element formed as part of the wavelength-selective means or may comprise a correction to a control instruction.

In some embodiments, and as shown in FIGS. 6 and 7, the wavelength selective element comprises a diffractive element, for example, a diffraction grating 32 and the control element comprises a temperature control element (not shown). The diffraction grating has a plurality of ridges and is characterised by its pitch (d) which is a measure of distance between consecutive ridges.

The diffraction grating 32 separates light into light beams of different wavelengths using diffraction and reflection. In other embodiments, a diffraction grating is provided that separates light into light beams of different wavelengths using diffraction and transmission. FIG. 6 shows the diffraction grating 32 operating to separate light of different wavelengths so that light of one wavelength is incident on a detector 34.

In use, a light beam comprising a plurality of light beams of different wavelengths is incident on the diffraction grating 32 at an angle of incidence $\theta_i$. Each separated wavelength beam has an output angle $\theta_o$ that is dependent on the wavelength of light and the pitch of the grating. The grating equation, below, governs the path taken by the light:

$$\sin\theta_i + \sin\theta_o = \frac{m\lambda}{d}$$

where m is the diffraction order of the diffracted light.

In the far-field, the beams of different wavelengths produced at different output angles become clearly separated. The grating 32 is centred at a fixed position so that the grating 32 and the detector 34 have a fixed spatial relationship. At a distance, denoted $L_2$ in FIG. 6, from the grating 32, the separation between beams is larger than, at least, the size of the detector such that only one of the separated beams is incident on the detector 34 at a particular time.

A non-mechanical temperature control element is coupled to the diffraction grating 32, details of which are provided with reference to FIG. 11. The control element controls the temperature of the grating 32 by heating or cooling. In further detail, the pitch of the grating 32, labelled d, is dependent on the temperature of the grating 32.

Mathematically, the dependence of the pitch, d, on a temperature change, may be expressed as:

$$d=d_0(1+\alpha\Delta T)$$

where $d_0$ represents the pitch at a nominal temperature, a is the coefficient of thermal expansion (CTE) and $\Delta T$ is the temperature change.

The temperature control element is coupled to change the temperature of the grating 32. By changing the temperature of the grating 32, the pitch of the grating is changed and thus the output angles of different wavelengths of the diffracted and separated light beams and the separation of the separated light beams is changed. Therefore, by changing the temperature of the grating, the direction of the diffracted light beams are changed. Depending on the size of the temperature change, this effect may either provide an adjustment to the direction of a light beam that was already selected to be directed to the detector, for example to increase a received signal and/or in response to movement of the detector or source. Alternatively, the change of separation may change which light beam is selected to be directed to the detector. By controlling the pitch of the grating 32, corrections to direction of a selected light beam or a new selection of light beam may be performed. Although a temperature control element is described to control the pitch of the grating 32, in some embodiments, the pitch may alternatively be changed by pulling or compressing the grating 32.

FIG. 7 shows the same configuration as FIG. 6, with grating 32 and detector 34, but with a lens 36 having a focal length. In some embodiments, other optical elements are used in place of the lens. The lens acts to reduce the distance required between the grating and detector.

The expansion and/or contraction of the grating 32 is dependent on the coefficient of thermal expansion of the material(s) from which the grating 32 is made, and thus dependent on the material of the grating. Table 1, below, shows some CTEs for materials that may be used for the grating:

| Material | CTE × $10^{-6}$ m/mK |
| --- | --- |
| PMMA (acrylic) | 70-80 |
| Polycarbonate | 65-70 |
| Polyethylene | 100-200 |
| N-BK7 (optical glass) | 7 |

An expected angular change may be estimated using the following parameters: grating pitch of 2 μm, a lens focal length of 10 mm, a wavelength of 800 nm and a temperature change of 50 K, results in a positional shift at the detector of 16 μm. This gives a positional shift of the light beam, measured at the detector of 16 μm.

In some embodiments, and as shown in FIG. 8, the wavelength selective element comprises a refractive element, for example, a prism 42 and the control element comprises a temperature control element (not shown).

The prism 42 separates light into light beams of different wavelengths using refraction and transmission. FIG. 8 shows the prism 42 operating to separate light of different wavelengths so that light of one wavelength is incident on a detector 44.

In use, a light beam comprising a plurality of light beams of different wavelengths is incident on the prism at an angle. The prism has a prism wedge angle $\theta_w$. Each separated wavelength beam has an output angle $\theta_{out}$ that is dependent on the refractive index of the prism and hence the wavelength of incoming light.

Mathematically, dispersion of light by the prism may be expressed as:

$$n \sin \theta_w = \sin(\theta_w + \theta_{out})$$

where n is the refractive index of light in the prism material. The refractive index varies with wavelength of light and therefore, the output angle is dependent on wavelength of light through the refractive index.

The beams of different wavelengths produced at different output angles become clearly separated. The prism 42 is centred at a fixed position so that the prism 42 and the detector 44 are at a fixed distance from each other. At a distance, denoted $L_2$ in FIG. 8, from the prism 42, the separation between beams is larger than, at least, the size of the detector such that only one of the separated, refracted, beams is incident on the detector at an instant in time.

Similar to the control element described with reference to FIG. 6, a non-mechanical temperature control element is coupled to the prism to control the temperature of the prism 42 by cooling or heating. In further detail, the refractive index, n, of the prism and is dependent on the temperature of the prism 42. This dependence may be expressed mathematically as follows:

$$n = n_0 + \frac{dn}{dT}\Delta T$$

where n represents the refractive index, $n_0$ represents a refractive index before a change in temperature, dn/dT is a measure of dependence of refractive index on temperature changes and $\Delta T$ the change in temperature.

The temperature control element can change the temperature of the prism 42. By changing the temperature of the prism 42, the refractive index of the prism 42 is changed, and thus the output angles of different wavelengths of light and the separation of the refracted light beams is changed. Therefore, by changing the temperature of the prism 42, the direction of the refracted light beams are changed.

Similar to the case of the diffraction grating, temperature change may either provide an adjustment to the direction of a light beam that was already selected to be directed to the detector or to change which light beam is selected to be directed to the detector.

The value of dn/dT is a characteristic of a material. Table 2, below, illustrates some example materials that the prism can be fabricated from, and their corresponding values of dn/dT.

TABLE 2

| Material | dn/dT ($\times 10^{-6} K^{-1}$) |
| --- | --- |
| PMMA (acrylic) | −105 |
| Polycarbonate | −107 |
| N-BK7 (optical glass) | 2.4 |

An expected angular change may be estimated using the following parameters: prism wedge angle of 35°, focal length of lens of 10 mm, wavelength of light 800 nm, and temperature change of 50 K. This gives a positional shift at the detector of 58 μm using PMMA.

In some embodiments, and as shown in FIG. 9, the wavelength selective element comprises an etalon, for example, a Fabry-Perot etalon 52. A Fabry-Perot etalon 52 acts as a filter, by allowing light to pass through if the value m, given by the equation below, is equal to an integer:

$$m = \frac{2nd}{\lambda}\cos\theta$$

In this equation, n is the refractive index of the material of the etalon and d is the thickness of the etalon. The angle θ is the angle of incidence of the received light and λ is the wavelength of the received light. In contrast to the grating and prism, the etalon does not separate light, but instead allows only light of one selected wavelength to pass through. Light having a wavelength different from the selected wavelength is reflected.

The etalon 52 may be temperature tuned using a temperature control element to change the thickness of the etalon in accordance with the coefficient of thermal expansion and to change the refractive index of the etalon.

A temperature control element is provided to change the temperature of the etalon 52. By changing the temperature of the etalon 52, the refractive index of the etalon 52 and thickness of the etalon is changed. Therefore, by changing the temperature of the etalon, the selection of wavelength and of permitted light is changed and/or the direction of the selected wavelength is changed.

Figure 10A:
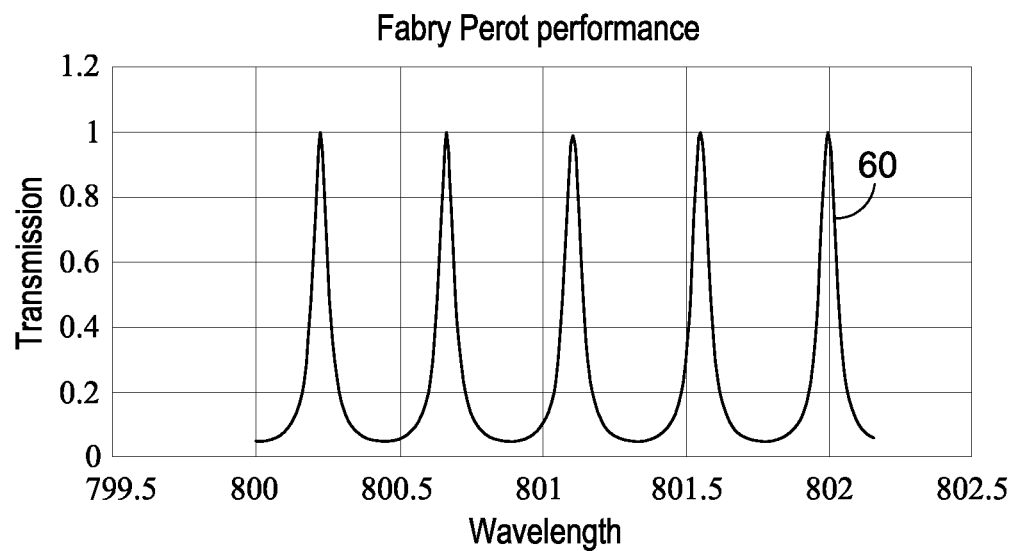
FIG. 10(a) is a plot of response of a fourth wavelength-selective element and FIG. 10(b) is a plot of response of the fourth wavelength-selective element at two different temperatures.
Figure 10B:
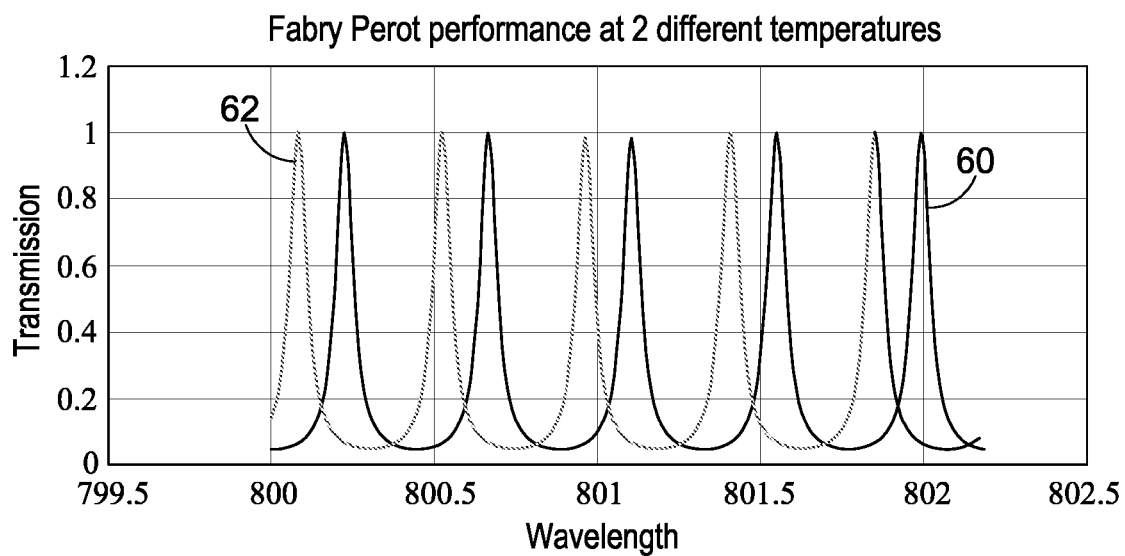

FIG. 10(a) shows a graph of a typical response of a Fabry-Perot etalon and FIG. 10(b) shows a graph of a typical response of the Fabry-Perot etalon at two different temperatures. The graphs shows how the amount of transmitted light varies with wavelength. The y-axis shows a measure of transmission that can take a value between varies zero and one. A transmission value of one corresponds to all light passing through the etalon. As can be seen in FIG. 10(a), maximum transmission is achieved at 5 different wavelengths in the wavelength range shown.

FIG. 10(b) shows the effect of a temperature change on the transmission. A first line 60 shows the same response as in FIG. 10(a). In FIG. 10(b), a second line 62 shows transmission values that are shifted to the left, such that maximum transmission values occur at five different wavelengths to those shown in FIG. 10(a). First line 60 and second line 62 are representative of responses at different temperatures.

The Fabry-Perot etalon can be fabricated using different materials. Table 3, below, shows some materials which could be used for a 0.5 mm thick Fabry-Perot filter and the corresponding temperature change to tune across 1 etalon period.

TABLE 3

| Material | Temperature change to tune across 1 etalon period |
|---|---|
| PMMA (acrylic) | 105 |
| N-BK7 | 65 |
| Fused silica | 65 |
| N-SF57 | 25 |

In summary, suitable wavelength-selective elements include: a reflection grating made from plastic (PMMA) and coated with a metallic layer, a plastic prism made from PMMA and a glass etalon made from one of N-BK7, fused silica or N-SF57.

The wavelength-selective elements described above, with reference of FIGS. 6, 7, 8 and 9 are described as being controlled using a temperature control element. In some embodiments, in place of the temperature control element or in addition to the temperature control element, a mechanical control element is provided to adjust the orientation and/or position of the wavelength-sensitive element. This can be provided for any of the above-described wavelength-sensitive elements. The mechanical control element may physically rotate and/or change orientation of the wavelength-sensitive element relative to the detector. In some embodiments, the detector and receiver apparatus may be physically rotated relative to the transmitter.

In some embodiments, both a temperature control element and a mechanical control element are provided. The mechanical control element may provide a first rotation and/or change in orientation and the temperature control element may provide a second rotation and/or change in rotation. The mechanical control element may be provided to give a large enough change to select a different beam from the separated beams to the detector. The temperature control element may be provided to provide fine-tuning and adjustment to the direction of propagation of the selected beam.

FIG. 11 shows two example implementations of a temperature change dependent control element. FIG. 11(a) shows a resistive heating element that includes a resistive heating coil between the control element and a mount for the control element. In this case, the coil is provided at a lower surface of the wavelength-selective element. The wavelength-selective element directly couples the heating element to the mount.

FIG. 11(b) shows a thermoelectric cooler included into a temperature change dependent control element. This may be used in a cooling or heating mode. The thermoelectric cooler device transfers heat from one side of the device to the other side of the device using electrical energy. In both FIG. 11(a) and FIG. 11(b) the wavelength-selective element is mounted on the heating element.

In some embodiments, a thermal conductor is wrapped around the wavelength-selective component to provide substantially equal heating throughout the component and to prevent appearances of thermal gradients within the component.

Non-mechanical temperature control elements may have an improved lifetime over mechanical counterparts. For non-mechanical temperature control elements, it is recognised that response time may be slow, in the range of milliseconds to seconds, but in many circumstances, slow response times are not as issue as changes in signal level should may occur over a long timescale. For example, movement of a receiver relative to a detector may occur slowly or tuning to a wavelength band on start-up. Both non-mechanical and mechanical control elements may be provided.

Figure 12:
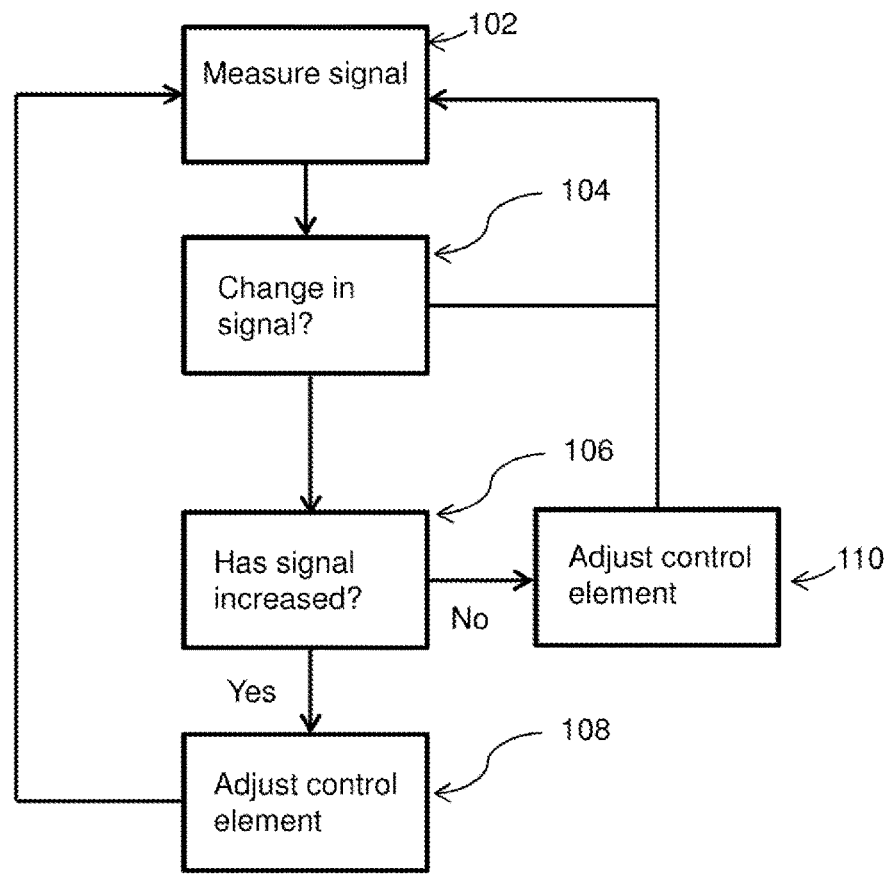
FIG. 12 is a flowchart illustrating a control algorithm for controlling the control element and wavelength selective elements.

In addition to the control element, as described above, a controller may be provided to control operation of the control element. FIG. 12 shows a flowchart of a method implemented for the controller to vary or maintain a physical property of the wavelength-selective element over time to maintain alignment of the output beam with the detector.

At a first step 102, a detection signal is measured by the detector or a value representative of the detection signal is determined. This may include determining the absolute amplitude of the detection signal or a relative change in amplitude of the detection signal. Alternatively, this may include determining the signal to noise ratio of the detection signal or other parameter representative of size or quality of the detection signal. In some embodiments, the measurement is made on the data signal obtained by processing the detection signal and includes a determination of a parameter representative of quality of data signal or amplitude of data signal. For the remaining steps of the process, the value of the signal is described, however, it will be understood that this value of the signal may be any parameter representative of the quantity or quality of the detected signal or underlying data signal.

At a second step 104, a determination of whether the signal has increased is made. In this step, a comparison is made between the value of the measured signal or representative value determined in step 102 and a previously stored corresponding value. If the comparison indicates that the signal has remained the same then the process continues back to step 102. The comparison step may include determining if the signal has remained substantially the same. The comparison step may include determining the difference between the value and the stored value and comparing the difference to a value representative of a measurement uncertainty or other threshold value. If the comparison step indicates that the signal has changed, then the process continues to step 106.

Step 106 corresponds to determining if the change in signal is representative of an increase in signal or value or a decrease in signal. This step may be performed as part of step 104, for example, determining a change in signal at step 106 may already provide the information needed to determine that the signal has increased or decreased. If the signal has increased, the process continues to step 108. If the signal has decreased, the process continues to step 110.

At step 108, a control signal is generated by the controller and sent to the control element to adjust the at least one physical property of the wavelength-selective element to induce an increase in the signal. A corresponding step 110 results if it is determined that the signal has decreased. At step 110 the control signal adjusts the at least one physical property of the wavelength-selective element to induce an increase in the signal.

Following steps 108 and 110, the process returns to step 102, where a further measurement of signal is made. The previous measurement is then stored for future comparison.

Figure 13:
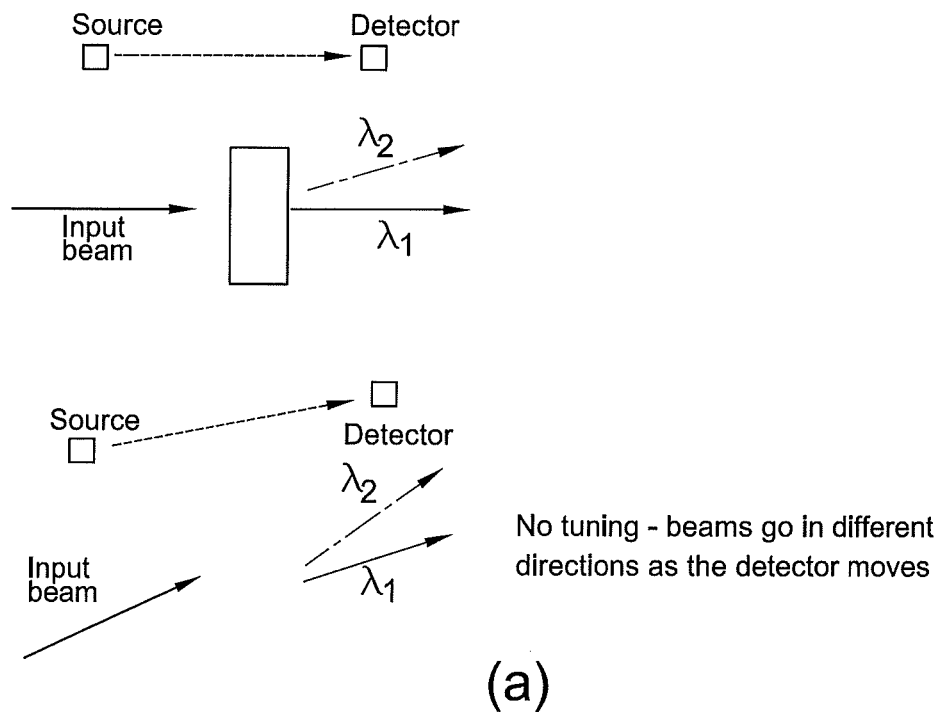
FIG. 13 illustrates a compensating mechanism.
Figure 13:
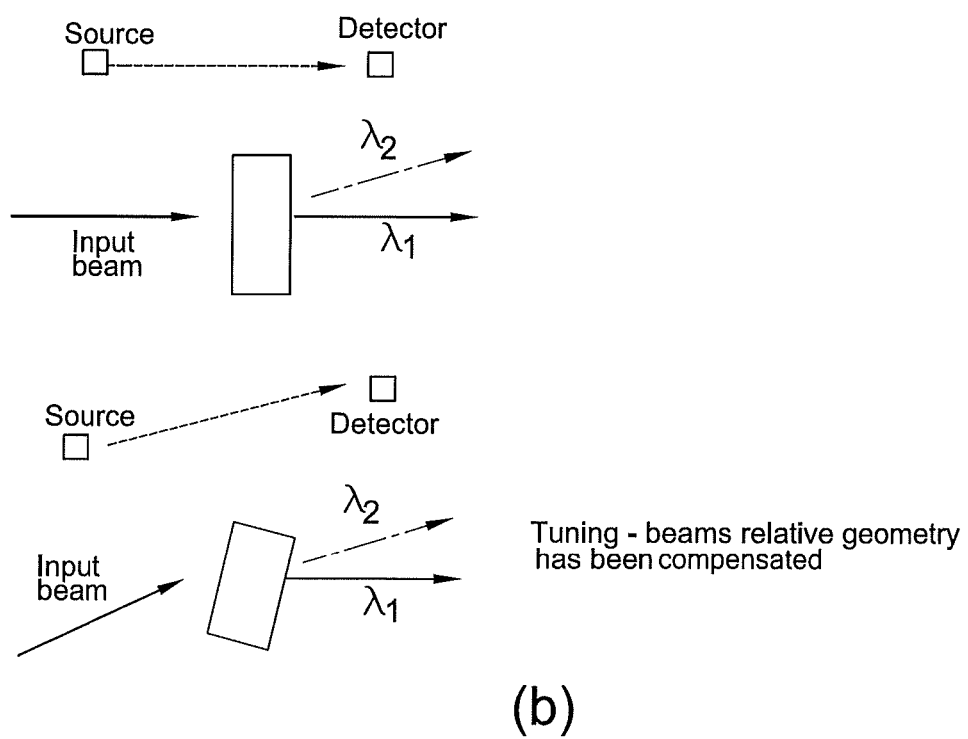

FIG. 13 illustrates how the apparatus may be used to compensate for change in incidence angle for the input beam. In some embodiments, a compensating resource is provided to correct for changes in incidence angle for the input beam. The compensating resource may be a further element formed as part of the wavelength-selective means or may comprise a correction to a control instruction.

FIG. 13(a) shows operation without a further compensating resource. As the detector moves relative to the source, the angle of incidence of incoming light changes and, if the detector moves to an off-centre position, the signal is likely to drop.

FIG. 13(b) shows operation with a further compensating resource. As the detector moves relative to the source, the angle of incidence of incoming light changes. The further compensating resource performs the control cycle of FIG. 12 until the drop of signal is, at least in part, reversed.

A skilled person will appreciate that variations of the enclosed arrangement are possible without departing from the invention. Accordingly, the above description of the specific embodiment is made by way of example only and not for the purposes of limitations. It will be clear to the skilled person that minor modifications may be made without significant changes to the operation described.

The invention claimed is:

1. An optical wireless communication (OWC) receiver apparatus for receiving data streams from a transmitter apparatus, each data stream encoded on a beam of light of a respective different wavelength or range of wavelengths propagating through free space between the transmitter apparatus and the receiver apparatus, the apparatus comprising:
a wavelength-selective element configured to receive the beams after their propagation through free space and to direct a selected at least one of the beams having a selected wavelength or range of wavelengths to a detector, wherein the detector is configured to receive the selected at least one of the beams and in response to output a detection signal,
wherein the wavelength-selective element is wavelength-sensitive such as to direct the selected at least one of the beams in a first direction relative to its direction of receipt based on its wavelength, and to direct at least one other of the beams in a second, different direction relative to its direction of receipt based on its wavelength;
a control element operable to control a physical property of the wavelength-selective element thereby to select the at least one of the beams for direction to the detector.

2. The apparatus according to claim 1, wherein the wavelength-selective element comprises compensating means to compensate for movement of the detector relative to the transmitter apparatus.

3. The apparatus according to claim 1, wherein the OWC receiver apparatus comprises a LiFi receiver apparatus.

4. The apparatus according to claim 1, wherein the wavelength-selective element is configured to receive the beams from substantially the same direction and to direct the beams in substantially different directions in dependence on their wavelengths.

5. The apparatus according to claim 1, wherein the wavelength-selective element is configured to receive the beams simultaneously as at least partially spatially overlapping beams.

6. The apparatus according to claim 1, wherein the wavelength-selective element comprises at least one of a diffractive element or refractive element.

7. The apparatus according to claim 1, wherein the directing comprises transmitting or reflecting.

8. The apparatus according to claim 1, wherein the wavelength-selective element comprises at least one of a diffraction grating, a filter, a prism or an etalon.

9. The apparatus according to claim 1, wherein the wavelength selective element comprises a wavelength convertor element configured to change the wavelength or range of wavelengths of the received beams.

10. The apparatus according to claim 9, wherein the wavelength convertor element is further configured to lengthen the wavelength of the received beams.

11. The apparatus according to claim 1, wherein the physical property comprises temperature.

12. The apparatus according to claim 1, wherein the physical property comprises position or orientation.

13. The apparatus according to claim 1, wherein the control element comprises at least one of a heating device, a cooling device or an actuator.

14. The apparatus according to claim 1, further comprising a controller operable to control operation of the control element, thereby to select at least one of the beam or wavelength.

15. The apparatus according to claim 1, wherein the controller is configured to control operation of the control element in response to at least one of: the detection signal; an orientation or position of the OWC receiver apparatus or the source; a relative orientation or position of the OWC receiver apparatus and the source; an instruction selecting at least one of the wavelengths; movement of the OWC receiver apparatus or the source.

16. The apparatus according to claim 1, wherein the controller is configured to at least one of control operation of the control element to maximise an amplitude or signal-to-noise ratio of the detection signal obtained in respect of the selected beam or maximise an amplitude or signal-to-noise ratio of a data signal representing the data stream of the selected beam and obtained by processing the detector signal.

17. The apparatus according to claim 1, wherein the controller is configured to implement a control algorithm to vary or maintain the physical property of the wavelength-selective element over time thereby to maintain alignment of the selected beam with the detector.

18. The apparatus according to claim 1, wherein the detector is positioned in a far-field position relative to the wavelength-selective element.

19. The apparatus according to claim 1, further comprising an optical element between the wavelength-selective element and the detector, optionally wherein the optical element comprises at least one of a lens or a focusing element.

20. The apparatus according to claim 1, wherein at least one of:
the detector comprises a photodetector; or
the detector is sensitive to a range of wavelengths that includes the different wavelengths or ranges of wavelengths of a plurality of the beams.

21. The apparatus according to claim 1, wherein the detection signal is representative of the data stream(s) represented by the selected at least one of the beams.

22. The apparatus according to claim 1 wherein the data streams are encoded using a pre-determined communication protocol, optionally a wavelength-division multiplexing protocol.

23. The apparatus according to claim 22, wherein the data streams represent a set of data, and different portions of the set of data are encoded on different ones of the beams according to the communication protocol.

24. The apparatus according to claim 1, wherein the source comprises a plurality of transmitters each configured to output light of respective different wavelength or ranges of wavelength.

25. The apparatus according to claim 1, wherein the beams of light comprise at least one of beams of visible light, infra-red light or ultra-violet light.

26. The apparatus according to claim 1, wherein the apparatus further comprises the detector.

27. The apparatus according to claim 1, wherein the apparatus is part of an optical wireless communication system that further comprises a transmitter apparatus configured to transmit a data stream encoded on a beam of light.

28. A method of controlling an optical wireless communication comprising:
operating a wavelength-selective element associated with a receiver,
wherein the receiver is configured to receive data streams from a transmitter apparatus, each data stream encoded on a beam of light of a respective different wavelength or range of wavelengths propagating through free space between the transmitter apparatus and the receiver,
and wherein the wavelength-selective element is configured to receive light beams after their propagation through free space and to direct a selected at least one of the beams having a selected wavelength or range of wavelengths to a detector, wherein the detector is configured to receive the selected at least one of the beams and in response to output a detection signal,
wherein the wavelength-selective element is wavelength-sensitive such as to direct the selected at least one of the beams in a first direction relative to its direction of receipt based on its wavelength, and to direct at least one other of the beams in a second, different direction relative to its direction of receipt based on its wavelength, and
wherein operating the wavelength-selective element comprises controlling physical property of the wavelength-selective element thereby to select the at least one of the beams for direction to the detector.

29. An optical wireless communication (OWC) method comprising:
receiving, by a receiver apparatus, data streams from transmitter apparatus, each data stream encoded on a beam of light of a respective different wavelength or range of wavelengths propagating through free space between the transmitter apparatus and the receiver apparatus;
receiving, by a wavelength-selective element of the receiver apparatus, the beams after their propagation through free space,
wherein the wavelength-selective element is wavelength-sensitive such as to direct the selected at least one of the beams in a first direction relative to its direction of receipt based on its wavelength, and to direct at least one other of the beams in a second, different direction relative to its direction of receipt based on its wavelength;
controlling, by a control element of the receiver apparatus, a physical property of the wavelength-selective element thereby to select at least one of the beams having a selected wavelength or range of wavelengths;
directing, by the wavelength-selective element, the selected at least one of the beams to a detector;
receiving, by the detector, the selected at least one of the beams; and
outputting, by the detector, a detection signal in response to receiving the selected at least one of the beams.

* * * * *